(12) United States Patent
Collura et al.

(10) Patent No.: US 8,495,287 B2
(45) Date of Patent: Jul. 23, 2013

(54) CLOCK-BASED DEBUGGING FOR EMBEDDED DYNAMIC RANDOM ACCESS MEMORY ELEMENT IN A PROCESSOR CORE

(75) Inventors: Adam B. Collura, Hyde Park, NY (US); Michael Fee, Cold Spring, NY (US); Arthur J. O'Neill, Jr., Poughkeepsie, NY (US); Gerard M. Salem, Essex Junction, VT (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/822,882

(22) Filed: Jun. 24, 2010

(65) Prior Publication Data

US 2011/0320716 A1    Dec. 29, 2011

(51) Int. Cl.
*G06F 12/08* (2006.01)
*G06F 12/16* (2006.01)

(52) U.S. Cl.
USPC .......................................... 711/106; 711/118

(58) Field of Classification Search
USPC ................................. 711/118, 106
See application file for complete search history.

(56) References Cited

U.S. PATENT DOCUMENTS

| | | | |
|---|---|---|---|
| 4,622,668 A | 11/1986 | Dancker et al. | |
| 5,313,608 A * | 5/1994 | Takai | 714/38.13 |
| 5,586,287 A | 12/1996 | Okumura et al. | |
| 5,754,557 A | 5/1998 | Andrewartha | |
| 5,793,776 A * | 8/1998 | Qureshi et al. | 714/724 |
| 6,708,269 B1 * | 3/2004 | Tiruvallur et al. | 712/225 |
| 7,055,006 B1 * | 5/2006 | Kelsey et al. | 711/139 |
| 7,185,148 B2 * | 2/2007 | Moyer | 711/118 |
| 7,330,928 B2 | 2/2008 | Obinata | |
| 7,555,605 B2 | 6/2009 | Moyer | |
| 2005/0273559 A1 * | 12/2005 | Aristodemou et al. | 711/125 |
| 2007/0006042 A1 * | 1/2007 | Beukema et al. | 714/38 |
| 2009/0154276 A1 | 6/2009 | Yang | |
| 2010/0005366 A1 | 1/2010 | Dell et al. | |

* cited by examiner

*Primary Examiner* — Sanjiv Shah
*Assistant Examiner* — Glenn Gossage
(74) *Attorney, Agent, or Firm* — Cantor Colburn LLP; John Campbell

(57) ABSTRACT

A method of debugging an embedded dynamic random access memory (eDRAM) element of a processor core is provided. An aspect includes, based on an error occurring in the eDRAM element, stopping a functional clock, and not stopping a refresh clock. Another aspect includes, based on the functional clock being stopped, creating a fence signal that prevents all commands other than a refresh command, the refresh command being based on the refresh clock, from entering into the eDRAM element. Another aspect includes initializing a line fetch controller of the processor core with at least one of write data and read data. Another aspect includes restarting the functional clock. Another aspect includes performing at least one of write requests and read requests to the eDRAM element based on the at least one of the write data and the read data from the line fetch controller based on the functional clock.

14 Claims, 4 Drawing Sheets

CLOCK-BASED DEBUGGING FOR EMBEDDED DYNAMIC RANDOM ACCESS MEMORY ELEMENT IN A PROCESSOR CORE

BACKGROUND

This invention relates generally to processing within a computing environment, and more particularly to methods and system for debugging a cache memory.

A cache is a memory component that improves processor performance by transparently storing data such that future requests for that data can be served faster. The data that is stored within a cache might be values that have been computed earlier or might be duplicates of original values that are stored elsewhere. If requested data is contained in the cache (cache hit), this request can be served by simply reading the cache, which is comparably faster. Otherwise (cache miss), the data has to be recomputed or fetched from its original storage location, which is comparably slower. Hence, the more requests can be served from the cache the better the overall system performance.

To debug certain problems or set up certain special test cases for the cache, it is desirable to be able to write data into the cache or read data out of the cache either before the system is running or after the system is running.

BRIEF SUMMARY

An embodiment includes a method of debugging an embedded dynamic random access memory (eDRAM) element of a processor core. An aspect includes, based on an error occurring in the eDRAM element, stopping a functional clock of the processor core, and not stopping a refresh clock of the processor core, the stopping of the functional clock permitting debugging access to the eDRAM element. Another aspect includes, based on the functional clock being stopped, creating a fence signal that prevents all commands other than a refresh command, the refresh command being based on the refresh clock, from entering into the eDRAM element. Another aspect includes initializing a line fetch controller of the processor core with at least one of write data and read data. Another aspect includes restarting the functional clock. Another aspect includes performing at least one of write requests and read requests to the eDRAM element based on the at least one of the write data and the read data from the line fetch controller based on the functional clock.

Another embodiment includes a processor core for debugging an embedded dynamic random access memory (eDRAM) element of the processor core. Another aspect includes the eDRAM element. Another aspect includes a line fetch controller. Another aspect includes a functional clock. Another aspect includes a refresh clock. Another aspect includes the processor core being configured to, based on an error occurring in the eDRAM element, stop the functional clock, and not stop the refresh clock, the stopping of the functional clock permitting debugging access to the eDRAM element. Another aspect includes, based on the functional clock being stopped, creating a fence signal that prevents all commands other than a refresh command, the refresh command being based on the refresh clock, from entering into the eDRAM element. Another aspect includes initializing a line fetch controller of the processor core with at least one of write data and read data. Another aspect includes restarting the functional clock. Another aspect includes performing at least one of write requests and read requests to the eDRAM element based on the at least one of the write data and the read data from the line fetch controller based on the functional clock.

Additional features and advantages are realized through embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiment of the present invention include methods, systems and computer program products that utilize processor components to write or read out specific entries in a cache memory for debug purposes. Further embodiments of the present invention include methods, methods, systems and computer program products for maintaining the data in the cache memory after a checkstop of the system.

Figure 1:
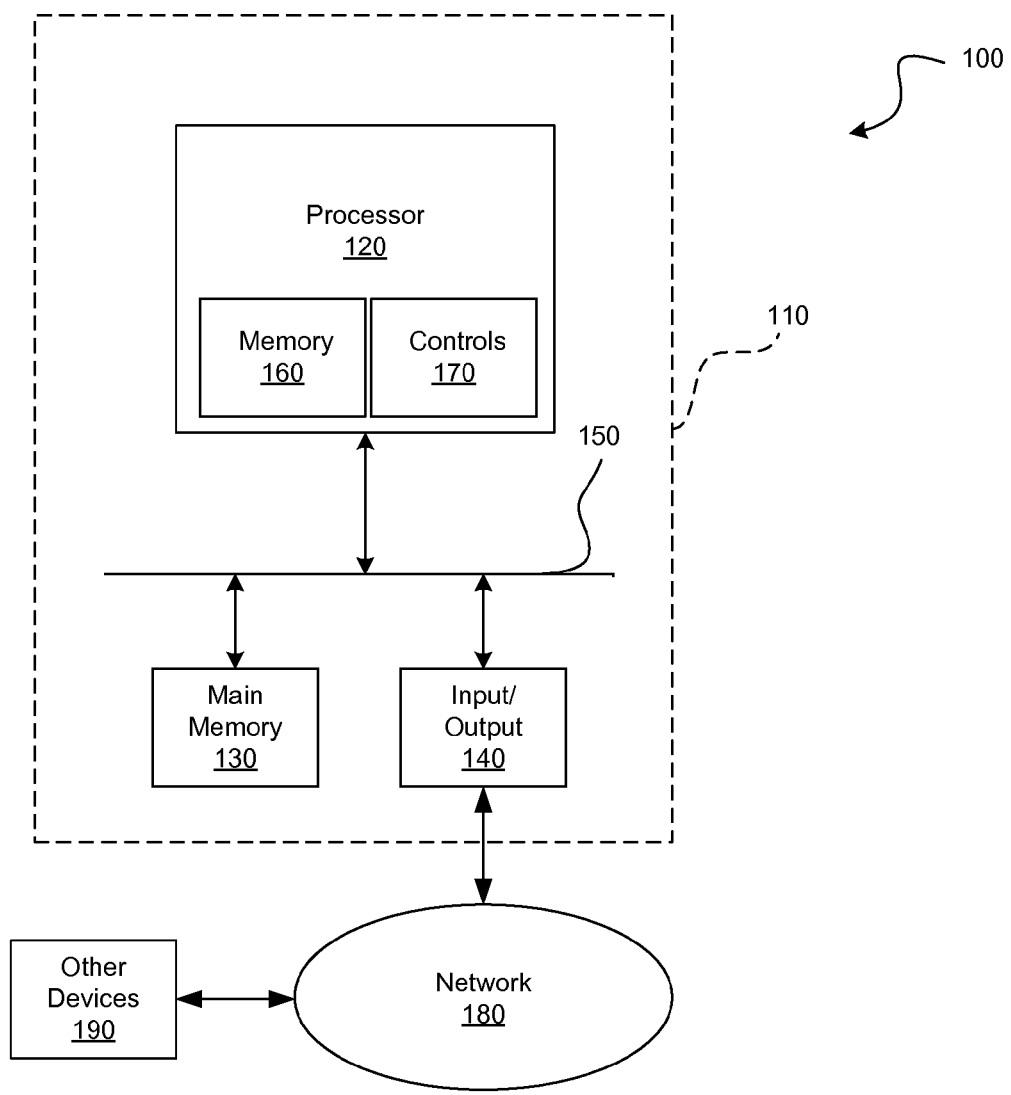
FIG. 1 depicts a computing system that includes a processor core including a cache debug system in accordance with exemplary embodiments.

FIG. 1 illustrates an exemplary computing system 100 that includes an exemplary computing device 110. The exemplary computing device 110 includes memory debug systems and methods in accordance with the present disclosure. As can be appreciated, the computing device 110 can be any computing device, including but not limited to, a server, a desktop computer, a laptop, a portable handheld device, or any other electronic device.

The exemplary computing device 110 includes, for example, at least one processor 120, main memory 130, and input/output component(s) 140 that communicate via a bus 150. The input/output component(s) 140 may include one or more components that facilitate local and/or remote input/output operations to/from the computing device, such as a display, keyboard, modem, network adapter, etc. (not shown).

When the computing device 110 is in operation, the processor 120 is configured to execute instructions stored within the main memory 130, to communicate data to and from the main memory 130, and to generally control operations of the computing device 110 pursuant to the instructions. The processor 120 may be any custom made or commercially available processor, a central processing unit (CPU), an auxiliary processor among several processors associated with the computing device 110, a semiconductor based microprocessor (in the form of a microchip or chip set), a macroprocessor, or generally any device for executing instructions. In various embodiments, the processor 120 includes the memory debug systems and methods as described herein.

In particular, the processor 120 includes memory 160 and controls 170 for aiding in the debug of the memory 160. During operation, the memory 160 communicates with the main memory 130 on behalf of the processor 120. For example, the main memory 130 may include various data stored therein (e.g., instructions, software, routines, etc.) that may be transferred to and/or from the memory 160 by the controls for execution by the processor 120. The memory 160 and controls 170 write data to and read data out of the memory 160.

The exemplary computing system 100 may further include a network 180 and other device(s) 190. The network 180 connects the computing device 110 with the other device(s) 190, and may include one or more wide area networks (WANs) and/or local area networks (LANs) such as, for example, the Internet, intranet(s), and/or wireless communication network(s). The other device(s) 190 may be, for example, one or more other computing devices, storage devices, peripheral devices, etc. The computing device 110 and other device(s) 190 are in communication via the network 180 (e.g., to communicate data therebetween).

Figure 2:
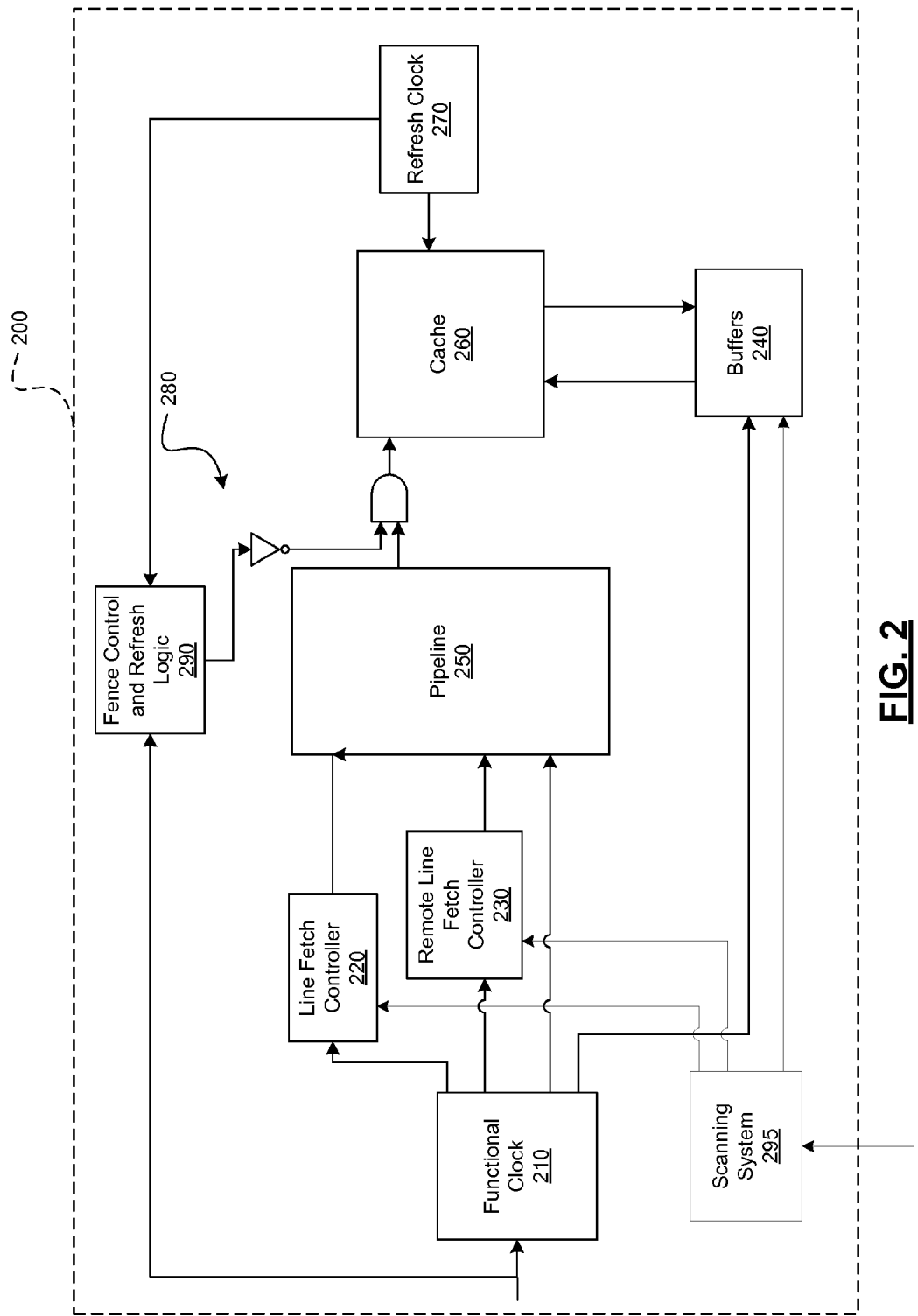
FIG. 2 depicts a cache debug system in accordance with exemplary embodiments.

FIG. 2 illustrates an exemplary processor subsystem of the processor 120 that is configured for debugging of the memory 160. The processor subsystem includes one or more memory elements 200. The memory elements 200 may include one or more cache levels (e.g., L1, L2, etc.) that may be on-chip or off-chip from a CPU. In various embodiments, one or more of the memory elements 200 can comprise embedded dynamic random access memory (eDRAM) or other random access memory. In various embodiments, a memory element 200 includes a functional clock 210, one or more line fetch controllers 220, one or more remote line fetch controllers 230, buffers 240 associated with the controllers 220, 230, a pipeline 250, and memory such as a cache 260. The memory element 200 can be further configured to include a refresh clock 270 and a refresh unit 280 which includes fence control and refresh logic 290.

Generally speaking, the functional clock 210 controls the operation of the components based on a first clock cycle. During operation, the controllers 220, 230 are used to feed data to the pipeline 250. Based on the data, the pipeline 250 executes instructions that write data to the cache 260 from the buffers 240 or that read data out from the cache 260 to the buffers 240. In various embodiments, the refresh clock 270 controls the operation of the cache 260 and the refresh unit 280 according to a second clock cycle. The exemplary subsystem can be used to debug the cache 260 when an error occurs.

To aid in the debugging of the memory 160, the memory element 200 includes a scanning system 295. The scanning system 295 receives input data provided by, for example, a user and scans the data to at least one of the line fetch controller 220, the remote line fetch controller 230, and the buffers 240. For example, when the processor subsystem is in an initial state or a checkstop state after the error has occurred, the functional clock 210 is off. The subsystem can then be scanned into a state such that the line fetch controller 220 and the remote line fetch controller 230 can write data into the cache 260 and read data out of the cache 260 respectively.

In particular, the line fetch controller 230 and remote line fetch controller 230 are requestors into the subsystem pipeline 250 and are generally used for the operations of writing data into the cache 260 and reading data from the cache 260. If a cache write operation is desired, the buffer 240 associated with the line fetch controller 220 can be scanned with the desired data to be written to the cache 260. If a cache read operation is desired, the remote line fetch controller 220 can be scanned with the desired commands to read data from the cache 260 to the buffer 240.

Once the controller 220 or 230 and buffers 240 are scanned with the desired operations and data, the functional clock 210 is activated for a number of cycles needed to arbitrate the data through the pipeline 250. If the desired operation includes reading data out of the cache 260, the buffer 240 can be scanned out so that the user can look at the data that was contained in the cache 260.

As can be appreciated, the subsystem may include multiple similar controllers 220, 230 associated with the cache 260 to complete multiple operations when multiple function clocks 210 are started. The operations may also be completed several times to write to or read portions of the cache 260.

Figure 3:
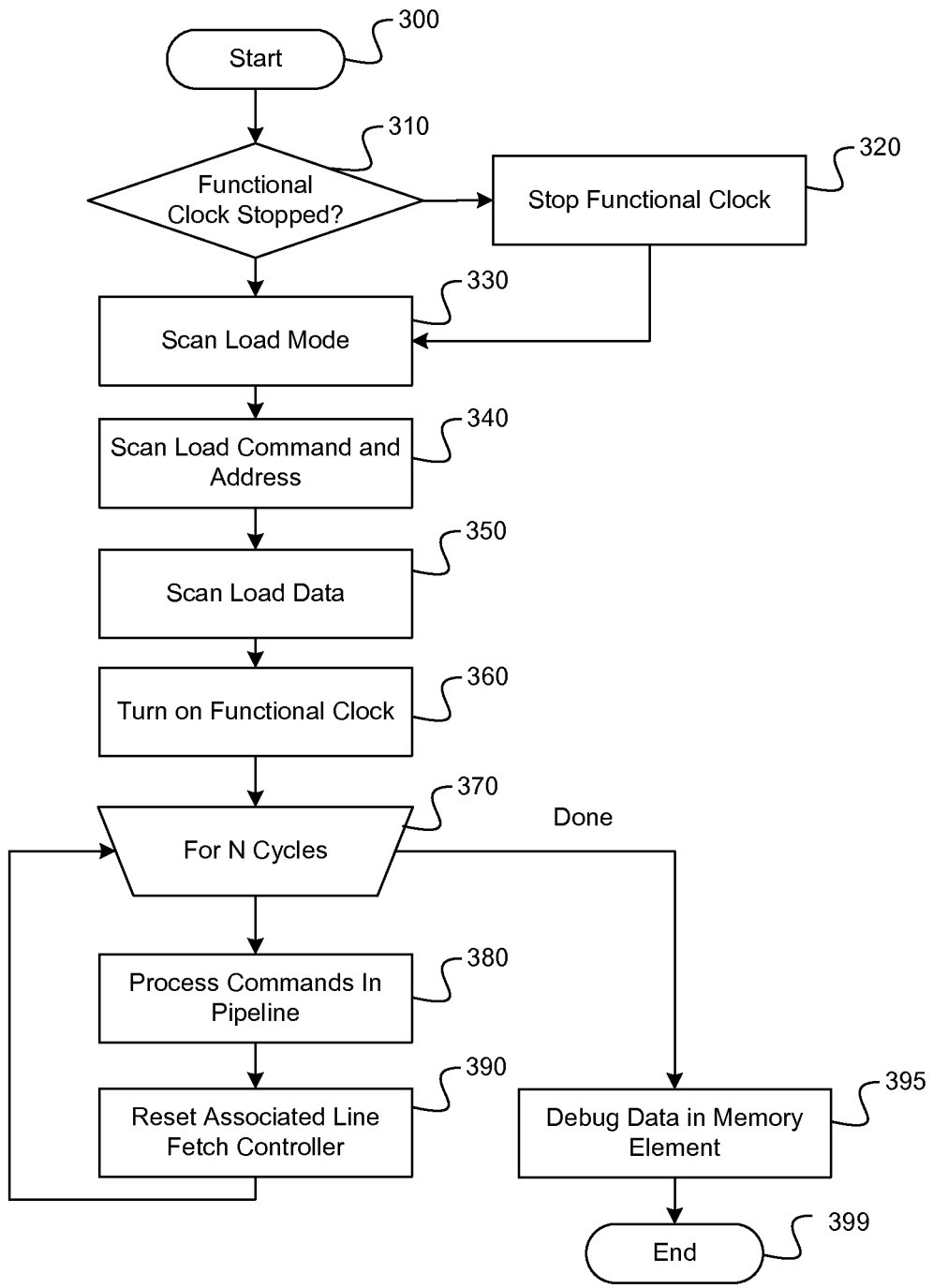
FIG. 3 depicts a write method using the cache debug system in accordance with exemplary embodiments.
Figure 4:
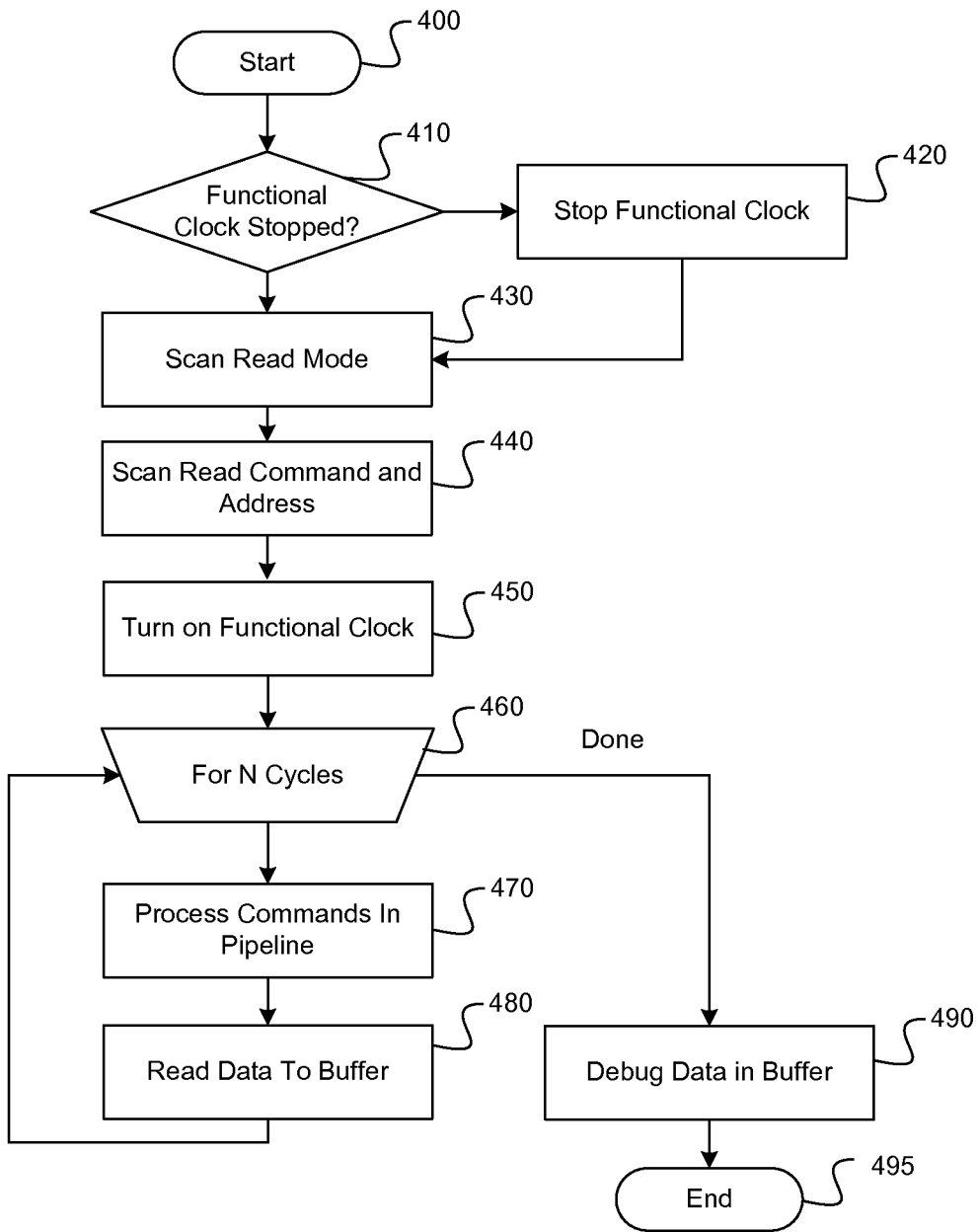
FIG. 4 depicts a read method using the cache debug system in accordance with exemplary embodiments.

With reference now to FIGS. 3 and 4 and with continued reference to FIG. 2, methods of debugging the memory element 200 are shown and described. In various embodiments, as shown in FIG. 3, a write method can be as follows. In one example, the method may begin at block 300. If it is determined that the functional clock 210 is not stopped at block 310, the functional clock 210 is stopped at block 320. With the functional clock 210 stopped, the line fetch controller 220 is scanned, for example, by a user using the scanning system 295, into a mode or state that writes cache lines as well as a command that writes to the cache 260 at scan mode load block 330. The mode or state includes a mode or state in which a request is ready to be placed into the pipeline 250. An address register can be scanned with an address of the cache 260 that the user would like to write to and the compartment the user would like to write to at scan mode command and address block 340. The line buffer is then scanned with the data that the user would like to write into the cache at scan load data block 350. In various embodiments, if multiple line fetch controllers 220 are provided, the user can choose to initialize all of the line fetch controllers 220 which permits the user to initialize many lines in the cache 260 at one time. As can be appreciated, the scan steps can be performed in single or multiple scans.

Once the line fetch controller 220 and the buffer 240 are initialized into the appropriate state and with all the desired data, the functional clock 210 can be turned on for a fixed number N of cycles at block 360 and block 370. The line fetch controller 220 places the request into the pipeline 250. The pipeline priority logic processes commands in the pipeline by prioritizing the requests and allowing the requests to enter into the pipeline 250 one at a time to write the data into the cache 260 at block 380. As each operation finishes, the associated line fetch controller 220 resets at block 390.

Once all of the writes are completed, the pipeline 250 will be quiet. The number of cycles N that is clocked should be just long enough to ensure this completes at block 370. The data is then present in the cache 260 for debugging at data in the memory element at block 395 and the method may end at block 399. These operations can then be repeated to write as many lines as needed.

In various embodiments, as shown in FIG. 4, a read method can be as follows. The method may begin at 400. The functional clock 210 is evaluated at block 410 and turned off at block 420. The mode to read data out as well as the desired read command and address are scanned, for example, by a user using the scanning system 295 similar to the write at blocks 430 and 440, respectively. As can be appreciated, the scan steps can be performed in single or multiple scans.

The functional clock 210 is then turned on or started at block 450, and flow proceeds to block 460, which repeats block 470 and block 480 for N cycles. A command from the remote line fetch controller 230 is processed and proceeds through the pipeline 250 to look up the address in a directory of the cache to determine if the address exists (cache hit) in the cache 260 at block 470. If the address does not exist (cache miss) the controller 230 indicates the operation missed by, for example, setting a latch and the operation ends. If the address does exist, the controller 230 indicates it hit by, for example, setting a latch. The data is read out of the cache and into the buffer 240 at block 480. Flow then proceeds back from block 480 to block 460, in which it is determined if blocks 470 and 480 have been repeated for N cycles; if blocks 470 and 480 have been repeated for N cycles, flow proceeds from block 460 to block 490; otherwise, blocks 470 and 480 are repeated again.

In various embodiments, performing one read per controller allows the user to read out many lines at one time. The pipeline 250 naturally manages and prioritizes the requests entering the pipeline 250 until they are all completed. The functional clock 210 should be turned off when all of the reads are done at 460. A line from the controller 230 and debug data in the buffer 240 is then scanned out and provided to the user to indicate whether the data existed in the cache 260, and if it did exist, what the data associated with that address was at block 490. Thereafter, the method may end at block 495. This operation can then be repeated for as many lines as the user would like to read out.

With reference back to FIG. 2, to prevent the data from being lost after checkstopping of the system, the fence control and refresh logic 290 can be controlled during the write and read activities. For example, when the functional clock 210 is off, the refresh clock 270 is generally turned on from the time of initialization and left on if the subsystem is using embedded dynamic random access memory (eDRAM). This is done so that the eDRAM can be refreshed as necessary to preserve the stored data. The associated logic can be fenced from other logic so that scanning or checkstopping logic can not alter the memory element in an undesired manner or prevent the refresh from occurring.

In various embodiments, the fence control and refresh logic 290 that is running on the refresh clock 270 can receive a signal from the functional clock 210 indicating that the functional clock 210 is off and can send a fence signal to the cache 260 and associated logic on the refresh domain. With the logic in the refresh domain fenced from the functional domain and the functional clock 210 turned off, the functional domain of the subsystem can then be scanned into a state such that the line fetch controller 220 and the remote fetch controller 230 can write data to the cache 260 and read data out of the cache 260, respectively.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, (radiofrequency) RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of debugging an embedded dynamic random access memory (eDRAM) element of a processor core, comprising:
    based on an error occurring in the eDRAM element, performing a) through e), comprising:
        a) stopping a functional clock of the processor core, and not stopping a refresh clock of the processor core, the stopping of the functional clock permitting debugging access to the eDRAM element;
        b) based on the functional clock being stopped, creating a fence signal that prevents all commands other than a refresh command, the refresh command being based on the refresh clock, from entering into the eDRAM element;
        c) initializing a line fetch controller of the processor core with at least one of write data and read data;
        d) restarting the functional clock; and
        e) performing at least one of write requests and read requests to the eDRAM element based on the at least one of the write data and the read data from the line fetch controller based on the functional clock.

2. The method of claim 1 wherein the initializing of the line fetch controller with write data comprises:
    scanning the line fetch controller into a write mode;
    scanning into the line fetch controller a command that writes to an address of the eDRAM element; and
    scanning a line buffer associated with the line fetch controller with a value to be written.

3. The method of claim 2 wherein one or more of the steps of scanning are performed by a user using a scanning system.

4. The method of claim 1 wherein the line fetch controller is a remote line fetch controller.

5. The method of claim 4 wherein the initializing of the line fetch controller with read data comprises:
    scanning the remote line fetch controller into a read mode; and
    scanning into the remote line fetch controller a command that reads from an address of the eDRAM element.

6. The method of claim 5 wherein one or more of the steps of scanning are performed by a user using a scanning system.

7. The method of claim 1 wherein the performing the at least one of the read requests and the write requests comprises prioritizing the at least one of read requests and write requests to allow them into a pipeline of the processor core one at a time.

8. The method of claim 7 further comprising resetting the line fetch controller as each of the least one of read requests and write requests finishes.

9. A processor core for debugging an embedded dynamic random access memory (eDRAM) element of the processor core, comprising:
    the eDRAM element;
    a line fetch controller;
    a functional clock; and
    a refresh clock;
    the processor core being configured to, based on an error occurring in the eDRAM element, perform a) through e), comprising:
        a) stop the functional clock, and not stop the refresh clock, the stopping of the functional clock permitting debugging access to the eDRAM element;
        b) based on the functional clock being stopped, create a fence signal that prevents all commands other than a refresh command, the refresh command being based on the refresh clock, from entering into the eDRAM element;
        c) initialize the line fetch controller of the processor core with at least one of write data and read data;
        d) restart the functional clock; and
        e) perform at least one of write requests and read requests to the eDRAM element based on the at least one of the write data and the read data from the line fetch controller based on the functional clock.

10. The processor core of claim 9 wherein the line fetch controller is a remote line fetch controller.

11. The processor core of claim 10 wherein the initializing of the line fetch controller with read data comprises:
    scanning to the remote line fetch controller into a read mode; and
    scanning into the remote line fetch controller a command that reads from an address of the eDRAM element.

12. The processor core of claim 9 wherein the initializing of the line fetch controller with write data comprises:
  scanning the line fetch controller into a write mode;
  scanning into the line fetch controller a command that writes to an address of the eDRAM element; and
  scanning a line buffer of the processor core associated with the line fetch controller with a value to be written.

13. The apparatus processor core of claim 12 wherein the processor core is configured to perform the at least one of the read requests and the write requests by prioritizing the at least one of read requests and write requests to allow them into a pipeline of the processor core one at a time.

14. The processor core of claim 13 wherein the processor is further configured to reset the line fetch controller as each of the least one of read requests and write requests finishes.

* * * * *